Patented Nov. 24, 1953

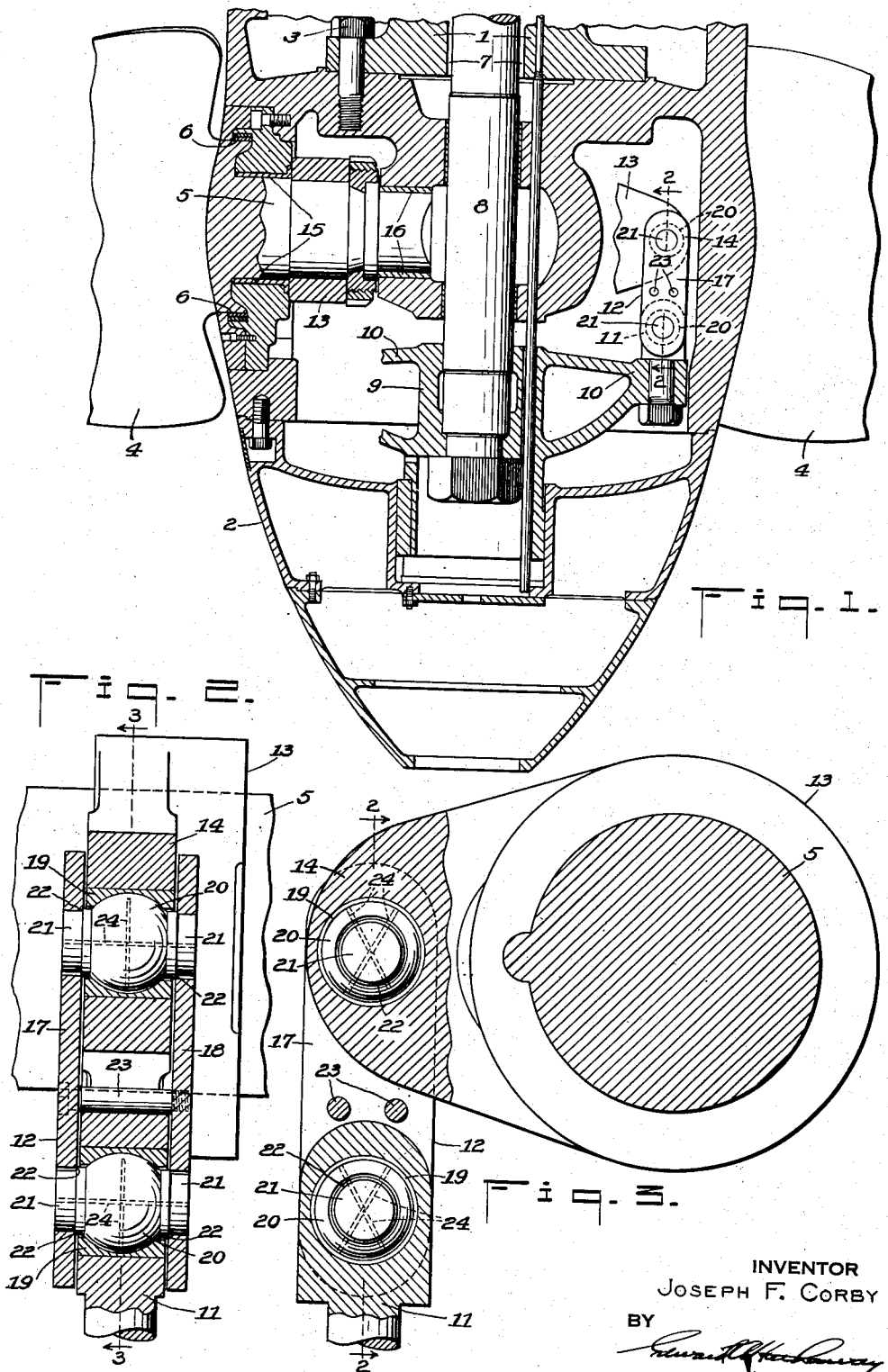

2,660,461

UNITED STATES PATENT OFFICE 2,660,461

SWIVEL JOINT

Joseph F. Corby, Philadelphia, Pa., assignor to Baldwin-Lima-Hamilton Corporation, a corporation of Pennsylvania Application March 10, 1947, Serial No. 733,699

1 Claim. (Cl. 287—93)

This invention relates to rotary hydraulic machines and more particularly to improved strain-free linkage means within the runner hubs for operating adjustable runner blades of propeller type hydraulic turbines and pumps.

In the operation of this type of machine, of which hydraulic turbines may be used as an example, a source of trouble results when the mechanism for adjusting the runner blades is gradually forced out of alignment by the wearing of the bearing bushings of the runner blade shanks. This wear takes place at two different points at least, as hereinafter described, causing the blade shank to sag at its outer end and to become elevated at its inner end. In time, this tilting or canting of the blade shank causes the links connecting the lever on the blade shank with an arm of the crosshead affixed to the runner blade operating rod to move out of free-running alignment. As a result, a severe strain develops on the bolts that hold each linkage assembly together and eventually causes the bolts to break and the links to work off their pins, thus freeing the runner blade. When this occurs, it is necessary to shut down the turbine without delay and make repairs, not only as to replacing the broken bolts but also of replacing the bushings, to eliminate strain on the new links, even though under ordinary circumstances such bearings might not necessarily have to be replaced. The new parts of course once again bring the blade adjusting mechanism into alignment. These repairs are not only costly but involve a considerable loss of time and revenue.

It is an object of my invention to provide improved blade operating means that will effectively function over long periods of time and will safely permit the shank bearing bushings to have excessive wear which without my invention might be so critical that replacement would be long past due. A further object is to provide improved blade operating means that will at all times be free of all undesirable strain caused by the gradual misalignment of the blade shank through the wearing of the blade shank bearing bushings.

The link assembly presently used in machines of the type herein disclosed is of a usual kind, consisting of two parallel members separated at each end by shouldered pins whose ends are set into the parallel members, the members being held together by several connecting bolts. It is these connecting bolts that break under strain applied to the link assembly and allow the parallel members to work loose from the shouldered pins. The reason for this strain is that the link has movement only in a plane at right angles to the axis of the blade shank and as the horizontal position of the blade shank axis becomes canted, due to the wearing of the blade shank bushings, the lever to which the upper end of the link is attached, also shifts its position, creating a lateral strain on the link assembly and on the bolts holding the assembly together. As the wear of the bushings increases and the blade shank axis tilts farther from the horizontal, the strain increases, resulting eventually in the breaking of these bolts and the disintegration of the link assembly.

Other objects and advantages will be more apparent to those skilled in the art from the following description of the accompanying drawings in which:

Fig. 1 is a vertical sectional view of the lower end of a propeller type hydraulic turbine, employing my invention and showing part of the runner blade adjusting mechanism;

Fig. 2 is a detailed sectional view of my improved link assembly taken along the lines 2—2 of Figs. 1 and 3, in the direction of the arrows; and Fig. 3 is a detailed sectional view of the link assembly, taken along the line 3—3 of Fig. 2 in the direction of the arrows, the balls and stud shafts being shown in full for the sake of clarity.

In the particular embodiment of the invention which is disclosed herein merely for the purpose of illustrating one specific form among possible others that the invention might take in practice, I show in Fig. 1 the lower end of a usual adjustable blade propeller type hydraulic turbine, well known in the art, comprising in the main a vertically disposed main shaft 1 flanged at its lower end to support a runner hub 2 by bolts 3. Two of any usual number of runner blades 4 have cylindrical shanks 5 rotatably mounted in annular recesses 6 in runner hub 2. Within a circular, axially extending bore 7 in the main shaft is a blade operating rod 8 rotatable with the main shaft but also capable of reciprocating movement therein. The lower end of operating rod 8 is bolted to a vertically reciprocating actuating element in the form of a crosshead 9, having radially disposed arms 10. Each of these arms is connected to one of the blade shanks 5 by means of an eyebolt 11 bolted to the arm, a linkage means 12 which is the subject of this invention, and a lever 13, keyed to blade shank 5 and having a hole in its outer end 14. The upper end (not shown) of operating rod 8 is in engagement with any usual and well-known governor system, actuating a servo-motor in the main shaft. This governor system, by means of the reciprocating movement of operating rod 8, crosshead 9, link 12 and lever 13, causes the pitch of the runner blades to be varied in accordance with power demands.

When runner blades are mounted within annular recesses 6, they are positioned so that their axes are at right angles to the axis of vertical blade operating rod 8. Annular clearances are provided between an outer bushing 15 and the blade shank and between an inner bushing 16 and the blade shank. Due to the weight of the runner blade, however, the blade shank axis is actually slightly canted from the horizontal from the moment the blade shank is mounted within the recess, the part of the shank nearer the runner blade bearing downwardly against the outer end of outer bushing 15 and the free end of the shank bearing upwardly against the inner end of inner bushing 16 to eliminate the clearances at these points of contact. A blade shank is accordingly never properly horizontally positioned, for at no time does it rest evenly on its bearing bushings, the weight of the runner blade and its shank being carried by the bushings only at the points of contact above indicated. When the machine is put in operation, therefore, the wear of the bushings is almost entirely at these contact points, causing an excessively rapid wearing of the bushings and a consequent rapid increased canting of the blade shank and lever 13 and bringing about within a relatively short time the lateral strain, above described, on the linkage unit of the conventional type.

To eliminate this lateral strain, I employ linkage unit 12, shown in detail in Figs. 2 and 3, in the place and stead of the ordinary link heretofore used. This novel linkage unit consists of two parallel members 17 and 18, in the upper and lower ends of which are oppositely disposed holes, as in the ordinary form of link. Instead of the usual shouldered pins connecting these pairs of holes, I employ an upper and lower ball and socket joint, each socket 19 being of cylindrical shape and made in halves and each ball 20 having two integrally formed stud shafts 21, extending in opposite directions and in axial alignment, which fit loosely into corresponding holes of the parallel members. Shoulders 22 between the stud shafts and the balls keep the parallel members evenly separated when connecting bolts 23 are finally inserted and tightened to hold the assembly together. Due to clearances provided between the parallel members and upper and lower sockets 19 and also between the annular openings in sockets 19 and shoulders 22, upper and lower sockets 19 have rotatable movement about their respective balls 20. The upper end of the link is pivoted to outer end 14 of lever 13 by inserting the upper ball and socket joint in the hole in outer end 14, while the lower end of the link is pivoted to eye-bolt 11, bolted to arm 10 of crosshead 9, by inserting the lower ball and socket joint in the eye of eye-bolt 11, as shown in Figs. 2 and 3. Clearances are also provided between the parallel members and outer end 14 at the upper end of the link and between the parallel members and eye-bolt 11 at the lower end of the unit. All or any of these clearances may be increased or diminished without affecting the operation of the link. Oil passages 24 are provided to keep the ball and socket joints lubricated by means of the lubricating oil normally filling the cavity of the runner hub.

*Operation.*—As bushings 15 and 16 of the blade shanks gradually wear at the points indicated and the blade shank axis accordingly begins to assume a more canted position, lever 13, being attached to the blade shank for rotary movement therewith, also begins to cant at the same angle and in the same direction. This direction is axial of stud shafts 21. Whereas this continued wearing of the bushings and the canting resulting therefrom would produce a lateral strain on the ordinary linkage unit and on the bolts holding such linkage assembly together, as above described, due to the fact that such ordinary linkage unit has no movement except in a plane at right angles to its shouldered pins, in the linkage unit I provide, such canting of the blade shank and lever 13 merely has the effect of causing upper socket 19 and lever 13, which is in engagement therewith to rotate about upper ball 20, the clearances above mentioned permitting such movement. When lever 13 and upper socket 19 have moved as far as the clearances in the upper part of the link permit, if further movement is required parallel members 17 and 18 then begin to move in the same direction with upper socket 19 and lever 13 until the parallel members come into contact with eye-bolt 11 rigidly affixed to arm 10 of crosshead 9. This would then be the limit of lateral movement. As stated, however, larger clearances can be provided which would increase this lateral movement without affecting the operation of the unit. It is clear that as a result of the cooperative lateral and swivel movements the link assembly is free of any undesirable strain, the ball and socket joints and the clearances around them permitting free unrestricted movement of the link not only in a plane at right angles to the axis of the stud shafts but also in all other vertical planes, including the plane in which the axis of the blade shank moves as its bushings wear.

From the disclosure herein, it is seen that I have provided a simple, expedient and reliable strain-free linkage means for correcting a serious defect in the runner blade adjusting mechanism of hydraulic machines of the type described that will prevent such machines from having to be shut down solely for the purpose of replacing broken linkages or bolts.

It will of course be understood by those skilled in the art that various changes may be made in the construction and arrangement of parts without departing from the spirit of the invention as set forth in the appended claim.

I claim:

A link connection for an adjustable blade operating arm and a reciprocating actuating arm of a rotary hydraulic machine comprising, parallel link members, a ball socket adapted to be supported in one of the arms at one end of the links, a ball in said socket and having two shouldered stud shafts formed integrally with and extending axially from the ball in opposite directions and passing loosely through the wall of said socket, aligned holes in adjacent ends of said parallel members to receive the oppositely extending integral stud shafts whose end portions outside of said shoulders are free from any axial holding action, the distance between the shoulders on said stud shafts being greater than the width of the operating arm whereby the parallel link members are set against said shoulders in substantially spaced relation to the sides of said arm, and a similar socket and a ball with similar shouldered stud shafts disposed at the other end of said link members for connection to the other arm, said latter stud shafts also having end portions which are outside of said shoulders and which are free from exerting any axial holding action, and said lateral bolts being disposed above the latter ball and socket whereby the lateral bolts commonly hold the links onto the free ends of the studs against the shoulders thereof so that the balls have the same freedom to swivel in their sockets regardless of the degree of the force with which the lateral bolts hold the link members to the balls.

JOSEPH F. CORBY.

References Cited in the file of this patent

UNITED STATES PATENTS

| Number | Name | Date |
|---|---|---|
| 1,318,704 | Sykes | Oct. 14, 1919 |
| 1,729,445 | Knape | Sept. 24, 1929 |
| 1,921,942 | Ratier | Aug. 8, 1933 |
| 2,028,448 | Harza | Jan. 21, 1936 |
| 2,048,324 | Diehl | July 21, 1936 |
| 2,065,509 | Bell et al. | Dec. 29, 1936 |
| 2,126,408 | Peo | Aug. 9, 1938 |
| 2,145,805 | Ring | Jan. 31, 1939 |
| 2,281,098 | Hennessy | Apr. 28, 1942 |
| 2,308,613 | Le Tourneau | Jan. 19, 1943 |
| 2,440,873 | Popp et al. | May 4, 1948 |
| 2,487,989 | Sherburne | Nov. 15, 1949 |